(12) United States Patent
Vaeretti et al.

(10) Patent No.: US 9,103,737 B2
(45) Date of Patent: Aug. 11, 2015

(54) VEHICLE BRAKE SYSTEM TESTING DEVICE AND METHOD

(71) Applicant: Honda Motor Co., Ltd., Tokyo (JP)

(72) Inventors: Thomas Vaeretti, Birmingham, AL (US); Bradley Buchanan, Pell City, AL (US)

(73) Assignee: Honda Motor Co., Ltd., Tokyo (JP)

(*) Notice: Subject to any disclaimer, the term of this patent is extended or adjusted under 35 U.S.C. 154(b) by 253 days.

(21) Appl. No.: 13/791,403

(22) Filed: Mar. 8, 2013

(65) Prior Publication Data

US 2014/0250995 A1    Sep. 11, 2014

(51) Int. Cl.
*G01L 5/28* (2006.01)
*B60T 17/22* (2006.01)

(52) U.S. Cl.
CPC ........ *G01L 5/28* (2013.01); *B60T 17/223* (2013.01)

(58) Field of Classification Search
CPC ............ B60T 17/221; B60T 2270/406; B60T 17/223; B60T 8/88; G01L 5/28
USPC .......................................................... 73/132
See application file for complete search history.

(56) References Cited

U.S. PATENT DOCUMENTS

| | | | |
|---|---|---|---|
| 3,602,043 A * | 8/1971 | Markey | 73/132 |
| 3,788,131 A * | 1/1974 | Markey | 73/132 |
| 3,877,299 A * | 4/1975 | Clayton et al. | 73/132 |
| 4,186,595 A * | 2/1980 | Domitter | 73/132 |
| 4,771,387 A | 9/1988 | Hexel et al. | |
| 5,299,668 A * | 4/1994 | Youngers et al. | 188/352 |
| 5,705,744 A | 1/1998 | Brugger et al. | |
| 6,202,519 B1 | 3/2001 | Yandt | |
| 6,363,774 B2 * | 4/2002 | Duff | 73/40 |
| 6,681,620 B2 * | 1/2004 | Sakamoto et al. | 73/132 |
| 6,736,003 B2 | 5/2004 | Takeda et al. | |
| 7,021,131 B2 | 4/2006 | Harrison et al. | |
| 8,521,391 B2 * | 8/2013 | Krueger et al. | 701/78 |
| 8,670,896 B2 * | 3/2014 | Hodorek et al. | 701/33.2 |
| 2004/0255688 A1 * | 12/2004 | Ok et al. | 73/818 |
| 2008/0215207 A1 * | 9/2008 | Heinze | 701/33 |
| 2009/0056432 A1 | 3/2009 | Steininger | |
| 2010/0188203 A1 | 7/2010 | Wallace et al. | |
| 2010/0292889 A1 | 11/2010 | Cahill et al. | |
| 2011/0126642 A1 | 6/2011 | Stähle | |

(Continued)

FOREIGN PATENT DOCUMENTS

| | | |
|---|---|---|
| EP | 2088439 A1 | 8/2009 |
| JP | 11-91540 A | 4/1999 |
| KR | 2001-0093925 A | 10/2001 |

(Continued)

*Primary Examiner* — Freddie Kirkland, III
(74) *Attorney, Agent, or Firm* — Standley Law Group LLP (57) ABSTRACT

Devices and methods for testing the brake system of a vehicle. Embodiments of the invention generally include an extendable rod that is adapted for removable installation between the steering wheel and brake pedal of a vehicle whose brake system is to be tested. Manual depression of the brake pedal with the device in place causes an extension of the extendable rod, the magnitude of which is measured by an associated sensor as brake pedal travel. A force sensor is provided to detect the amount of force applied to the brake pedal by a user's foot during testing. A controller receives signals from the sensors and determines whether the brake system passes the test. The controller may be coupled to an on-board diagnostics connector of the vehicle to receive and analyze other vehicle data, and to read the VIN of the vehicle.

26 Claims, 5 Drawing Sheets

(56) References Cited

U.S. PATENT DOCUMENTS

2011/0130935 A1* 6/2011 Krueger et al. ................. 701/70
2013/0205882 A1* 8/2013 Neu et al. ........................ 73/132

FOREIGN PATENT DOCUMENTS

| SE | 522388 C2 | 2/2004 |
| WO | 2006/089536 A1 | 8/2006 |

* cited by examiner

VEHICLE BRAKE SYSTEM TESTING DEVICE AND METHOD

TECHNICAL FIELD

The present invention is directed to devices and methods for testing vehicle brake systems.

BACKGROUND

During the manufacture of a vehicle, a number of steps (e.g., tests) may be performed to ensure, or help to ensure, that various vehicle subsystems are functioning properly. The subsystems involved, and the associated test procedures may vary considerably, as may the consequences of a malfunction.

While it is certainly desirable to any vehicle manufacturer that all the subsystems of a vehicle it produces operate properly when the vehicle leaves the factory, it should be understood that a heightened level of scrutiny is typically given to critical vehicle functions such as steering and braking. With respect to a brake system, for example, it may be desirable to check for leaks, for proper pedal pressure, for proper pedal travel, etc. In this manner, it can be reasonably ensured that the vehicle will function safely and properly after delivery to a customer.

To this end, a variety of devices and methods have been developed and employed to test vehicle brake systems and/or vehicle brake system components at some stage during the vehicle manufacturing process. A first category of such devices includes simple shaft-based devices that may be placed between a vehicle brake pedal and another vehicle structure to maintain the brake pedal in a depressed state while a user inspects the brake system from outside the vehicle. A second and more complex category of brake system testing devices are also known. These devices are normally designed to rest on the floor or the driver's seat of a given vehicle and typically include a reciprocating actuator that is provided to repeatedly depress and release a brake pedal. Operation of these more complex devices may be conducted remotely, such as by a remote control held by a user while outside of the vehicle of interest.

Yet other devices have been developed that do not interact with a brake pedal but, rather, interact directly with the brake booster of a vehicle's brake system to create brake pressure independently of the actuation of the brake pedal. Creation of brake pressure in this manner gives rise to travel of the brake pedal. The amount of travel of the brake pedal may then be detected using a sensor, etc.

While each of the devices and their methods of use may function to produce the intended result, there are drawbacks to each. For example, the devices of the first simplistic category mentioned above are essentially just braces for holding a brake pedal in a fixed depressed position while a user observes other parts of a vehicle's brake system.

The more complex devices of the aforementioned second category of brake system testing devices may provide additional functionality, such as brake pedal stroking by means of an included actuator. However, these devices are also generally expensive to produce, cumbersome to handle, and require sufficient space on either the floor or seat of the vehicle of interest. This latter characteristic also typically means that a user of the device cannot occupy the driver's seat of the vehicle while the device is in use.

It should be apparent that use of brake system testing devices such as those that connect to a brake booster or similar brake system component also requires a fairly complex setup, and further necessitates a connection to pressurized, closed-loop components. Clearly, this is a more time consuming and complicated process than one that acts directly on the brake pedal itself, and this process also still requires some means of directly measuring brake pedal travel.

With respect to testing vehicle brake systems during the manufacturing process, it should also be realized that it is today fairly commonplace for a given manufacturing facility to produce more than one vehicle model. Therefore, it is preferable that a brake system testing device be usable with more than one vehicle. Otherwise, it may be necessary to employ a dedicated testing device for each vehicle produced, which increases costs, requires additional storage space, complicates the process, and increases the likelihood for a testing error.

In this regard, while the above-mentioned brake system testing devices of the second category may be the most useful due to their ability to both depress a brake pedal with a given force and also measure brake pedal travel, such devices normally suffer from an inability to easily operate with multiple vehicle models. This deficiency may be due to space limitations, to differences in distances, angles, etc., between the brake pedals of different vehicles and a supporting area for the devices, and/or for other reasons.

Consequently, it can be understood from the foregoing observations that there is a need for a vehicle brake system testing device that can be cost-effectively produced, is easy to manipulate and operate, and may be used to test the brake systems of multiple vehicles. Brake system testing devices and methods of the invention satisfy this need.

SUMMARY

Devices and methods according to the invention allow for simple and efficient testing of a vehicle brake system. While it is possible for devices and methods of the invention to be used post-manufacturing, it is contemplated that the invention is ideally suited for vehicle brake testing during the manufacturing phase of a vehicle.

Embodiments of the invention generally include an extendable (e.g., telescopic) rod that is coupled at one end to a steering wheel engaging element, and at the other end to a brake pedal engaging element. This allows the device to be extended or retracted as needed to fit between the steering wheel and brake pedal of a given vehicle. Either or both of the brake pedal engaging element and steering wheel engaging element may be pivotable in nature to further enhance the flexibility of the device.

A force sensor is attached to the brake pedal engaging element to detect the amount of force applied to the brake pedal by a user during testing. More particularly, the force sensor is located on the brake pedal engaging element so that after the device is secured between the steering wheel and brake pedal of a vehicle, the force sensor is actuated by a user's foot when depressing the brake pedal during a brake testing operation. The force sensor is thus able to determine how much force is exerted on the brake pedal during the test.

The device is also able to determine how far the brake pedal is depressed by the user's foot (i.e., the stroke). One or more sensors may be provided for this purpose, as is described in more detail below. A controller is also included, and may be attached to the steering wheel engaging element so as to be conveniently viewable by a user during testing. The controller may include a display, or may be associated with a display that presents information transmitted thereto by the controller.

During use of the device, the engine is started and the user slowly depresses the brake pedal until the force gauge indicates some predetermined force on the display and then holds the brake pedal in the depressed condition for some period of time.

During testing, the controller receives an indication of the amount of force exerted on the brake pedal by the user's foot, as well as an indication of the resulting brake pedal stroke distance. The controller may also detect leaks in the brake system by watching for a slow fade (decline) in the amount of force required to maintain the depressed position of the brake pedal. The controller then determines whether the test passed or failed based on a comparison of brake pedal stroke distance versus brake pedal depression force and the absence or presence of any leaks.

The controller may further include an on-board diagnostics (OBD) communication port, such as a diagnostics port that conforms to the OBD-II standard. Prior to conducting a test, a corresponding OBD coupler of the vehicle may be connected to the OBD port on the controller, such that the controller can monitor and record other vehicle conditions (manifold pressure, temperatures, etc.) as they exist during the test. In this manner, the test results can be analyzed in consideration of the conditions in existence at the time of testing.

Coupling the controller to the OBD connector of a vehicle also allows the controller to read the vehicle identification number (VIN) of the vehicle. Since the VIN may be used to identify the specific vehicle model being tested, it is possible to provide a single testing device with multiple testing programs so that the device can appropriately calibrate itself for the particular brake system being tested. It is also possible for a device of the invention to link testing data for a given vehicle with the VIN for said vehicle, and to either store the data and VIN locally until subsequent transference by docking the controller with a PC, etc., or to transmit the data and VIN to a remote data storage location by wired or wireless data communication techniques.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

One exemplary embodiment of a brake system testing device 5 of the invention is illustrated in FIGS. 1A-1B and FIGS. 2-3. As shown, the brake system testing device 5 includes an extendable rod—in this case, a telescopic rod 10—having a steering wheel engaging element 15 at a proximal end and a brake pedal engaging element 20 at a distal end. Extendable (e.g., telescopic) rods used in different embodiments of the invention may have may have various cross-sectional shapes and may be comprised of various materials such as, without limitation, metals, plastics and composites. Extendable rods used in different embodiments of the invention may have a maximum stroke limit.

Figure 1A:
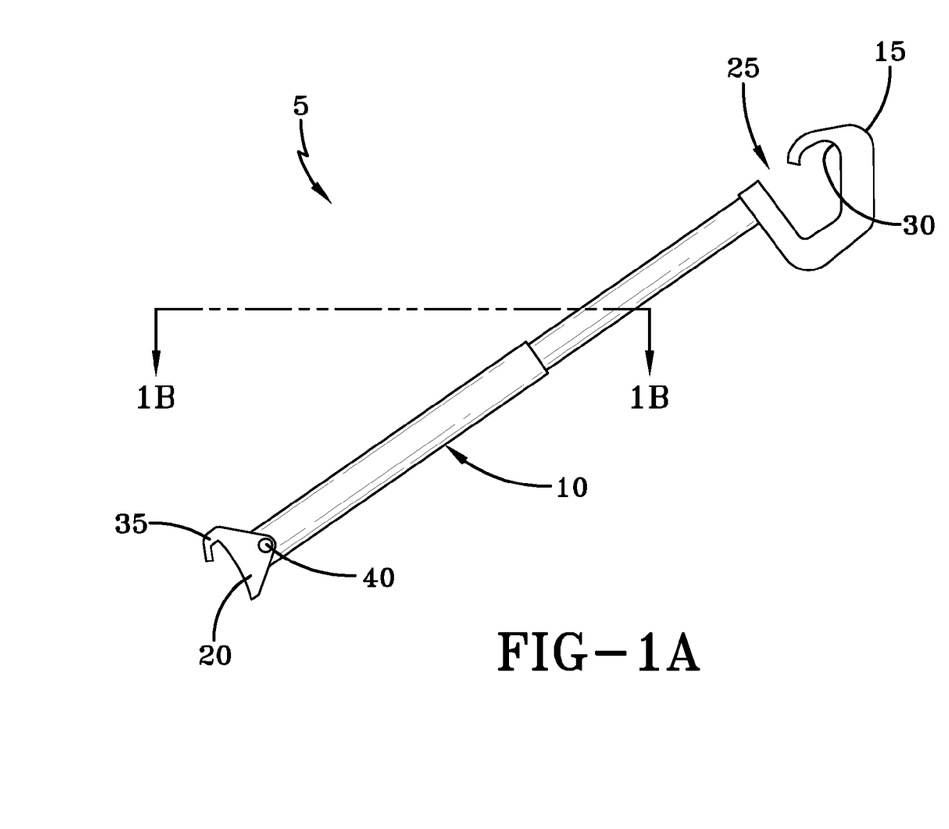
FIGS. 1A and 1B are a side view and partial top view, respectively, of one exemplary embodiment of a brake system testing device of the invention.
Figure 1B:
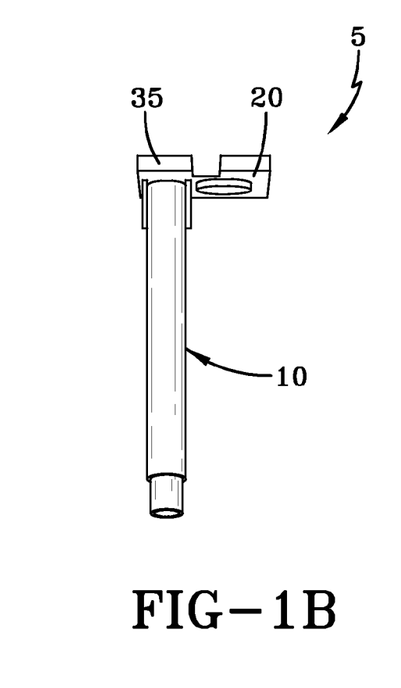

The telescopic rod 10 allows the overall length of the brake system testing device 5 to be adjusted. Consequently, the brake system testing device 5 may be used on different vehicles having dissimilar steering wheel-to-brake pedal distances. To this end, it is preferred that the steering wheel engaging element 15 and brake pedal engaging element 20 be designed to sufficiently grip or otherwise engage the steering wheel and brake pedal, respectively, such that the neither the steering wheel engaging element nor brake pedal engaging element will become disengaged from the steering wheel or brake pedal during an extension of the telescopic rod 10.

The steering wheel engaging element 15 may be of various shapes, but is preferably adapted to engage the rim of the steering wheel of a vehicle of interest—as discussed above. In the particular brake system testing device 5 shown herein, the steering wheel engaging element 15 is shown to be substantially hook-shaped for this purpose. As shown, this particular hook-shaped steering wheel engaging element 15 includes a passage 25 through which the rim of a steering wheel may be passed, and a rim-retaining groove 30 that contacts and engages the steering wheel rim when the brake system testing device 5 is properly installed for testing. While other shapes may be possible, a hook-shaped steering wheel engaging element 15 has proven during testing to facilitate steering wheel engagement and deliberate disengagement. With respect to the steering wheel engaging element 15, a user may also hand-apply an assisting engagement element-to-steering wheel retention force during a testing operation.

The brake pedal engaging element 20 may also be of various shapes and designs. However, providing the brake pedal engaging element 20 with a substantially hook-shaped portion 35 also facilitates retention of the brake pedal engaging element on the brake pedal of a vehicle during testing. The brake pedal engaging element 20 is preferably pivotally connected by a hinge pin 40 or similar element to the distal end of the telescopic rod 10. Such a pivotal connection allows for increased flexibility when installing the brake system testing device 5 to vehicles with different steering wheel rim-to-brake pedal angles. Such a pivotal connection also allows the brake pedal engaging element 20 to rotate as the brake pedal to which it is attached moves along an arcuate path as the brake pedal is depressed during a brake system test (see below). While not shown herein, it is also possible for the steering wheel engaging element 15 to be pivotally connected to the telescopic rod 10 in a similar manner.

In other embodiments of the invention, the telescopic rod may be biased, such as by a physical or fluid-based spring element, an elastomeric element, etc., such that the steering wheel engaging element 15 and brake pedal engaging element 20 are drawn toward one another (i.e., the telescopic rod is retracted) to some degree absent a countering force. For example, in the embodiment shown in FIG. 1A, a coil spring may be located within the larger diameter section of the telescopic rod 10 and connected to the smaller diameter section so as to pull the smaller diameter section into the larger diameter section absent the presence of a countering force. This biasing effect may be used to assist in maintaining, or to maintain, engagement of the steering wheel engaging element 15 and brake pedal engaging element 20 with the steering wheel and brake pedal, respectively.

Figure 2:
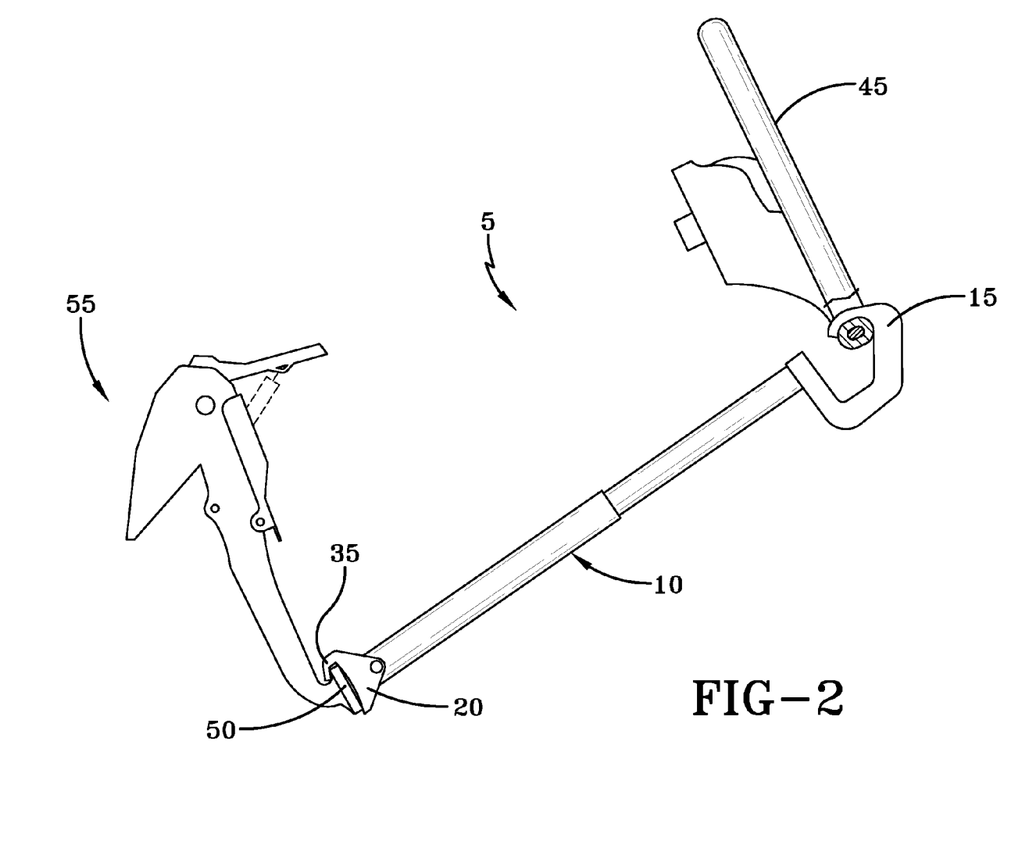
FIG. 2 depicts the brake system testing device of FIGS. 1A-1B installed between the steering wheel and brake pedal of an exemplary motor vehicle.

The brake system testing device 5 of FIGS. 1A-1B is depicted in FIG. 2 in an installed position between the steering wheel 45 and brake pedal 50 of an exemplary vehicle. The brake pedal 50 is shown to be associated with an exemplary brake pedal assembly 55 used for activating the brake system of the vehicle, as would be familiar to one of skill in the art. It can be understood that in this particular exemplary embodiment, engagement of the steering wheel engaging element 15 with the rim of the steering wheel 45 and engagement of the brake pedal engaging element 20 with the brake pedal 50 acts to securely maintain the brake system testing device 5 in the position shown in FIG. 2 unless acted upon by a user, as described below.

Figure 3:
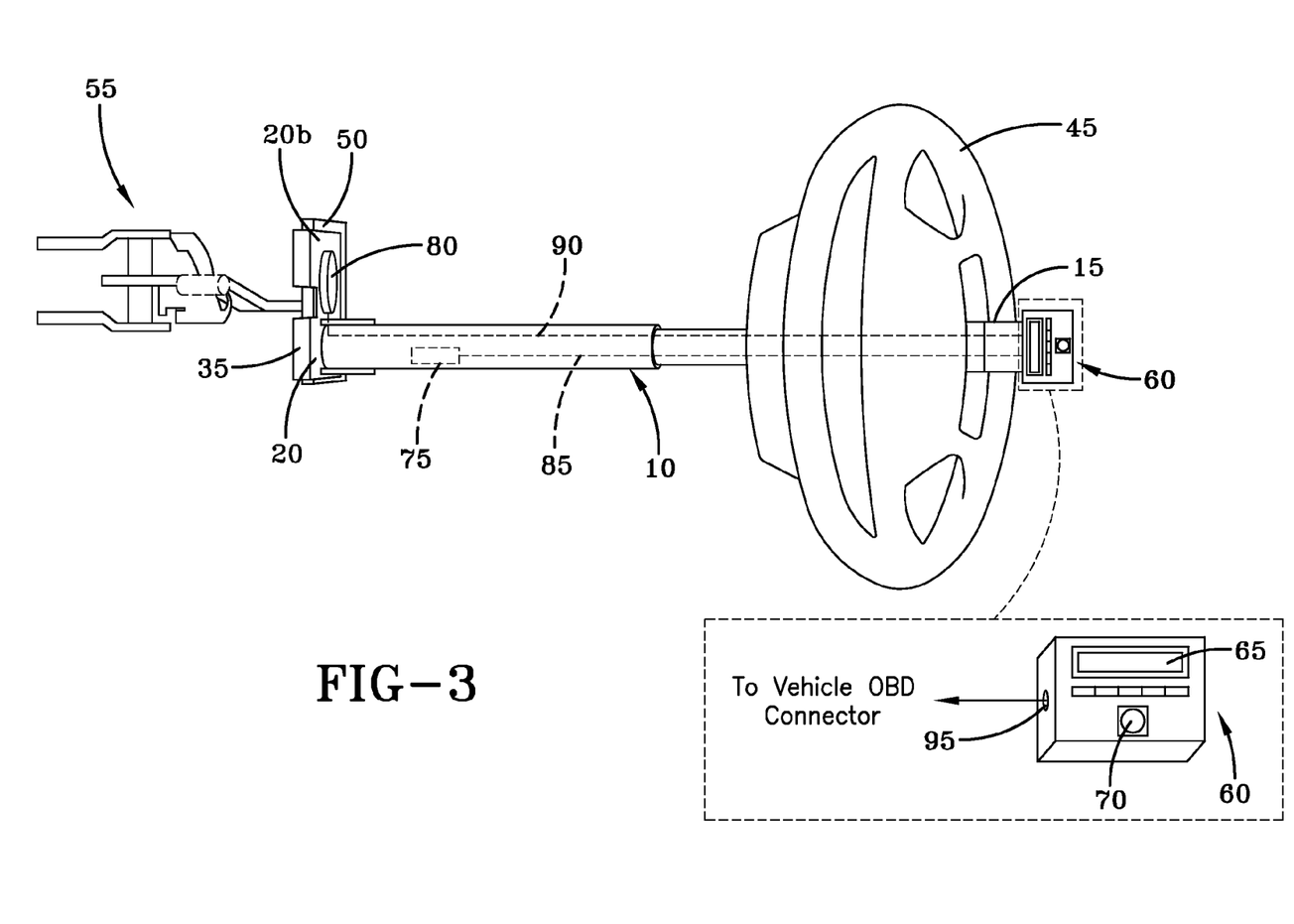
FIG. 3 is an alternate view of FIG. 2, revealing additional elements of the device.

Referring now to FIG. 3, it can be observed that the brake system testing device 5 also includes a controller 60. In this exemplary embodiment, the controller 60 is attached to the steering wheel engaging element 15. Other locations of the controller are also possible in other embodiments. For example, a controller may be attached to the telescopic rod 10, or may be a separate element that is carried by a user, temporarily attached to a steering wheel, etc., but still in wired or wireless communication with the various sensors (see below) of the associated brake system testing device so as to receive appropriate signals therefrom.

This particular exemplary embodiment of the controller 60 also includes an integrated display (indicator) 65 for presenting messages and other information to a user of the brake system testing device 5. While the controller 60 of this particular embodiment is shown to be a combined controller/indicator device, it should be realized that the controller and indicator of other brake system testing device embodiments could also be separate components that are placed in wired or wireless communication with one another such that the display may receive and display information transmitted thereto by the controller.

The controller 60 is also shown to include a start button or similar testing initiation actuator 70 that allows an operator to initiate a brake system test once the brake system testing device 5 is properly installed between the steering wheel 45 and brake pedal 50 of a vehicle. The start button 70 may also double as a test cancellation button, or a separate button may instead be provided for this purpose. A controller of the invention may also include any variety of additional indicator lights and audible indicators, as well as additional buttons, switches and/or other actuators for activating/deactivating other controller functions, changing displayed information, etc.

An increased understanding of brake system testing device 5 operation can be gained by further reference to FIG. 3, wherein certain sensors thereof are illustrated. More specifically, a first, brake pedal stroke measurement sensor 75 and a second, brake pedal depression force sensor 80, are shown to be a part of the brake system testing device 5.

The brake pedal stroke measurement sensor (stroke measurement sensor) 75 may be located internally to the telescopic rod 10, as shown. Alternatively, the stroke measurement sensor 75 may be located externally to the telescopic rod. In either case, the stroke measurement sensor 75 is adapted to determine the displacement of the brake pedal 50 during a brake testing operation by measuring the extension of the telescopic rod 10.

Various types of sensors may be employed as a stroke measurement sensor 75. For example, and without limitation, the stroke measurement sensor 75 may be an optical sensor, a Hall effect sensor, or a linear variable differential transformer (LVDT).

A wired connection 85 between the stroke measurement sensor 75 and controller 60 is depicted in FIG. 3 for purposes of illustration. In the case of such a wired connection, the associated wiring 85 may be routed through the interior of the telescopic rod 10 as shown, or the wiring may run externally to the telescopic rod. Obviously, an internal location of the wiring 85 results in a cleaner brake system testing device 5 and also affords a degree of protection to the wiring itself. The controller end of the stroke measurement sensor wiring 85 may be hardwired to the controller 60, or may terminate in a connector that facilitates connection and disconnection of the controller therefrom by means of a corresponding controller connector.

The brake pedal depression force sensor 80 is located on the brake pedal engaging element 20 of the brake system testing device 5. In this particular embodiment, the brake pedal depression force sensor 80 is located on the user side of the brake pedal engaging element 20, but it may also be possible to locate the brake pedal depression force sensor on the brake pedal side of the brake pedal engaging element as long as inadvertent actuation can be avoided. In either case, the brake pedal depression force sensor 80 is located so that depression of the brake pedal 50 by a user while the brake system testing device 5 is installed between the steering wheel 45 and brake pedal, will also cause an actuation of the brake pedal depression force sensor. More particularly, the brake pedal depression force sensor 80 is located so that placement of the user's foot on a provided foot contact portion 20b of the brake pedal engaging element 20 will also result in the user's foot overlying the force sensor. Consequently, a subsequent pressing of the user's foot against the brake pedal 50 will also actuate the brake pedal depression force sensor 80, such that the force sensor will output a signal that is representative of the magnitude of the depressing force exerted on the brake pedal by the user's foot.

Various types of sensors may be employed as a brake pedal depression force sensor 80. For example, and without limitation, the brake pedal depression force sensor 80 may be one of a variety of strain gage-based sensors. The use of piezoelectric or variable capacitance type sensors may also be possible.

For purposes of illustration, a wired connection 90 between the brake pedal depression force sensor 80 and controller 60 is depicted in FIG. 3. In the case of such a wired connection, the associated wiring 85 may be routed through the interior of the telescopic rod 10 as shown, or the wiring may run externally to the telescopic rod. As in the case of the stroke measurement sensor 75, an internal location of the brake pedal depression force sensor wiring 90 results in a cleaner brake system testing device 5 and also affords a degree of protection to the wiring itself. The controller end of the brake pedal depression force sensor wiring 90 may be hardwired to the controller 60, or may terminate in a connector that facilitates connection and disconnection of the controller therefrom by means of a corresponding controller connector.

In addition to the exemplary wired connections 85, 90 depicted in FIG. 3, wireless communications between the controller 60 and the stroke measurement sensor 75 and brake pedal depression force sensor 80 are also contemplated. Such wireless communications would be familiar to one of skill in the art and, therefore, need not be described in detail herein. In this regard, it is to be understood that any components necessary to effectuate such wireless communications may be associated with the brake system testing device 5. For example, in the case of one-way communications, the sensors 75, 80 may be associated with respective wireless transmitters and the controller 60 may be associated with a corresponding wireless receiver. In the case of two-way communications, the sensors 75, 80 may be associated with respective wireless transceivers and the controller 60 may be associated with a corresponding wireless transceiver. Various wireless communication techniques may also be employed including, but not limited to, Bluetooth® and other developed or as yet undeveloped short-range wireless connectivity standards.

As mentioned above, the controller is preferably associated with a display, which may be an integrated display 65 or a separate display that is in wired or wireless communication with the controller. In either case, the display 65 may be used for example, to convey the initiation, status and/or completion of a brake testing operation. Such a display may also be used to indicate brake pedal stroke and brake pedal depression force readings from the stroke measurement sensor 75 and brake pedal depression force sensor 80, respectively. In the case of a brake system testing device that is programmed to test the brake system of more than one vehicle model, the display may also be used to indicate the currently selected programs as well as other selectable programs that are available. A variety of other communications may be accomplished via the display, and none of the examples provided herein are to be considered limiting in nature.

The controller 60 is operative to monitor signals from the stroke measurement sensor 75 and brake pedal depression force sensor 80 and to determine whether a brake system test passes or fails. To this end, the controller includes a microprocessor and associated memory, or a microcontroller, etc., which is either programmed to evaluate data associated with a brake system test or to operate in conjunction with associated software that is designed to evaluate data associated with a brake system test. The controller may further include an on-board diagnostics (OBD) communication port, such as a diagnostics port that conforms to the OBD-II standard. The function of the optional OBD port is described in more detail below.

In operation, a user removably installs the brake system testing device 5 between the steering wheel 45 and brake pedal 50 of a vehicle of interest, as shown in FIGS. 2-3. The installation process may occur prior to the user entering the vehicle, or after the user is already seated in the vehicle. In addition to installing the brake system testing device 5 as described and shown, the OBD connector of the vehicle may also be connected to the corresponding OBD port 95 on the brake system testing device controller 60. This connection may be made before or after the brake system testing device 5 is installed between the steering wheel and brake pedal. Once the brake system testing device 5 is securely installed to and connected to the OBD port of the vehicle, a brake system test may be initiated.

Testing of a vehicle brake system using the brake system testing device 5, requires a running vehicle engine. Consequently, if the vehicle engine is not running prior to installation and connection of the brake system testing device 5, the vehicle engine is started prior to initiating a brake system test. With the engine running and prior to initialization of a brake system test, it has been determined that pumping the brake pedal several times may be beneficial in the case of new vehicles whose brake calipers have yet to be extended. In this case, stroking the brake pedal prior to initiating a brake system test allows the calipers to be extended and the brake pads to be pressed against the brake rotors.

In the case of a brake system testing device programmed to perform brake testing operations of more than one vehicle model, it should be first ensured that the correct testing program is selected. Program selection may be accomplished manually, or automatic program selection may be performed by the controller after reading or being provided with the VIN of the vehicle being tested.

With the brake pedal fully released, a brake system test is then initiated by pressing the controller start button 70 or activating the test initiation actuator otherwise provided. The display 65 may thereafter indicate that a test has started, may provide the user with instructions, or may be initially blank (with the understanding that the user is familiar with proper brake system testing device operation).

A typical test procedure will next involve the user placing a foot on the brake pedal (as well as brake pedal engaging element 20 and brake pedal depression force sensor 80), depressing the brake pedal slowly until some predetermined depression force is sensed by the brake pedal depression force sensor and displayed on the display 65, and holding the brake pedal in the depressed position with the desired depression force for some predetermined amount of time. For example, the testing procedure may call for a user to depress the brake pedal until a 20 kgf force is detected and indicated, and to then maintain the brake pedal in the depressed position under the 20 kgf depression force (or as close a holding force as possible) for 6-9 seconds. As with indicating the achievement of a desired depression force, the display may also be used to indicate the time at which the brake pedal may be released.

It may also be desirable to depress the brake pedal at some predetermined rate or within some rate range. For example, it may be desirable to depress the brake pedal at a rate of between approximately 9-13 mm/sec. In this regard, the display 65 may also be used to inform a user whether the brake pedal was depressed within the desired rate of movement range and/or to inform the user that the brake pedal must be released and re-depressed because the rate of movement was too fast, etc. It is further contemplated that lights, etc., may also be used, in lieu of or in addition to the display, to indicate whether the brake pedal has been depressed at an unacceptable rate.

Assuming that the brake pedal has been properly depressed, a number of measurements typically take place. For example, the stroke measurement sensor 75 transmits signals indicative of the brake pedal stroke distance (i.e., the brake pedal travel) corresponding to the application of the desired brake pedal depression force. The actual brake pedal depression force may also be measured using the brake pedal depression force sensor 80. The brake pedal depression force may be measured at one point in time during brake pedal depression, or at multiple points in time (for averaging, etc.). Pedal stroke speed may also be determined by capturing multiple signals from the stroke measurement sensor 75 over a known period of time. Other measurements/readings may also take place, such as those related to various vehicle temperatures, pressures, etc., gathered through the testing device-to-vehicle OBD connection. Other information may also be captured or determined, and the aforementioned examples are not to be considered limiting in this regard.

One particular vehicle condition of interest that may be determined during a brake system test is manifold pressure. One of skill in the art should understand that the source of vacuum for a vacuum-operated vehicle brake system is typically the vacuum port of the engine intake manifold, and that vehicle manifold pressure changes as the temperature of the vehicle's engine changes. The expected results (pedal force, travel, etc.) of a brake system test may also vary based on manifold pressure. For example, at a lower manifold pressure (and correspondingly higher manifold vacuum level), a longer brake pedal stroke will typically be required to produce a given brake pedal depression force. Therefore, an expected range of brake pedal stroke and depression force values may be associated with various manifold pressures.

To this end, while connecting a brake system testing device to the OBD port of a vehicle is not essential to use of a brake system testing device of the invention, one of skill in the art should understand that use of a vehicle's OBD system allows for the detection of other vehicle conditions, such as manifold pressure, that may be used to more accurately evaluate the function of the vehicle's brake system. Particularly, knowing the manifold pressure at the time of brake system testing permits the selection of brake pedal stroke and depression force values that correspond to the given manifold pressure. Without reading manifold pressure, and possibly other vehicle conditions (e.g., engine RPM, engine temperature, etc.), evaluating the results of a brake system test would require making certain assumptions about the condition of the vehicle being tested. While this is certainly possible, also obtaining the aforementioned vehicle data via an OBD connection helps to ensure the accuracy of the brake system test analysis and conclusion.

Figure 4:
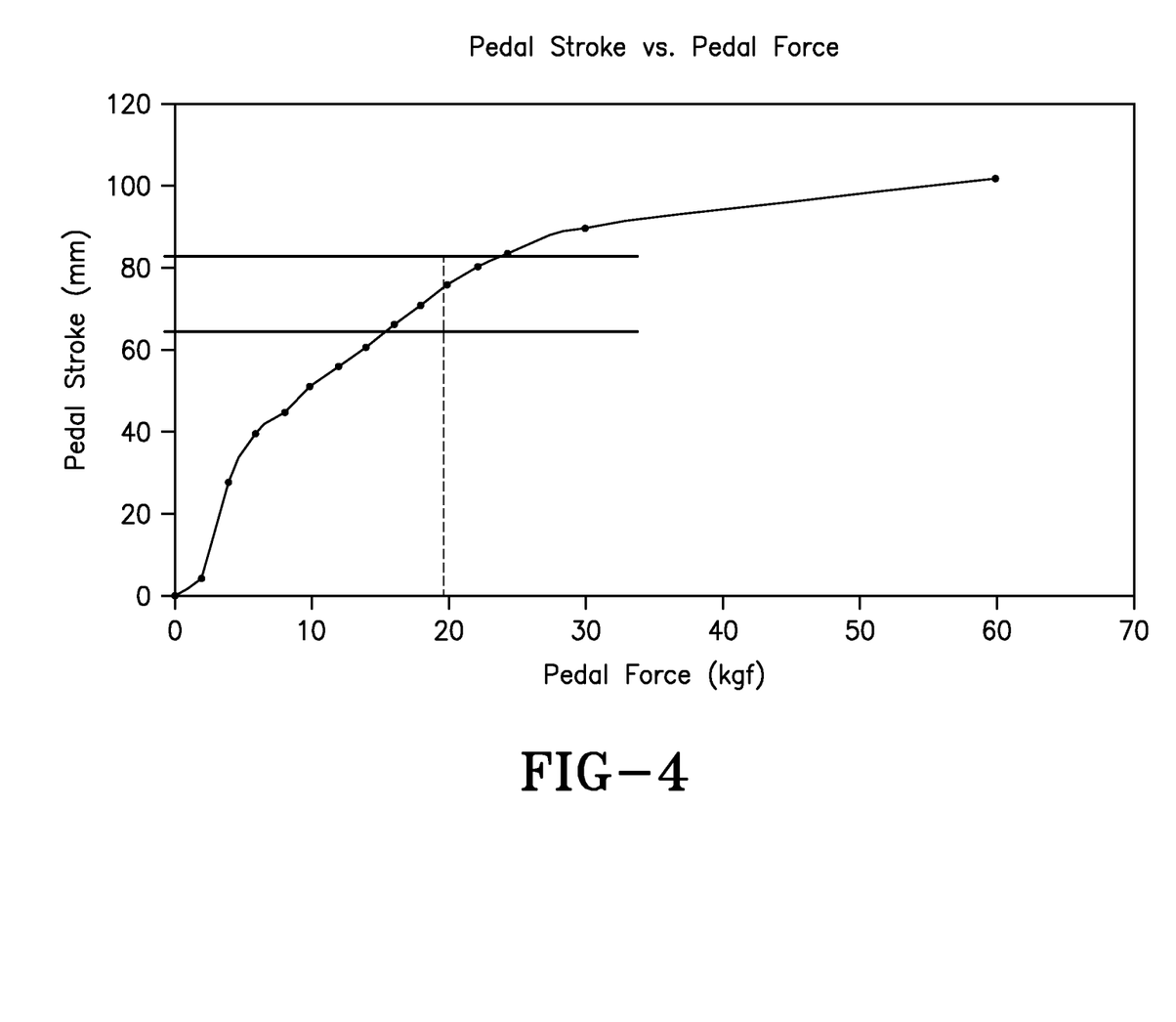
FIG. 4 graphically depicts a pass/fail analysis associated with an exemplary brake system testing operation using a brake system testing device and method of the invention.

FIG. 4 illustrates how information gathered by the various sensors of the brake system testing device 5 is used by the controller 60 to determine whether the brake system test passed or failed. It should be realized that there are various ways that the gathered information may be analyzed to make such a determination. In this particular example, the controller 60 correlates brake pedal depression force with brake pedal stroke distance to make such a determination. This can be observed in the graph of FIG. 4 as the intersection point of the desired 20 kgf brake pedal depression force and the curve resulting from plotting various measured brake pedal stroke distances against corresponding observed brake pedal depression forces. In this case, it can be seen that a 20 kgf brake pedal depression force was achieved at a brake pedal stroke distance of between about 60-80 mm. As a brake pedal stroke distance range of 60-80 mm at a 20 kgf brake pedal depression force is considered acceptable in this particular example, the brake system test is considered successful (i.e., the test passed).

As described above, the brake pedal depression force to brake pedal stroke distance correlation may be evaluated based on values expected at one or more of a given vehicle manifold pressure, engine temperature, engine RPM, etc. These values may be stored in tables or charts that are saved in or may be accessed by the controller 60. To save data space, a force vs. stroke curve such as that shown in FIG. 4 may be constructed from a limited number of points (e.g., 10), at each of which a given pedal depression force may be associated with an expected pedal stroke range.

In addition to a pass/fail determination based on an analysis of brake pedal stroke distance vs. brake pedal depression force, the controller 60 may also be programmed to check a brake system for leaks. This may be accomplished by monitoring the brake pedal stroke position while a user maintains a substantially constant depression force on the brake pedal while using the brake system testing device 5. In this case, a change (increase) in stroke at a constant pedal depression force is likely to indicate a leak. Alternatively, brake pedal depression force may be monitored during the time that the brake pedal is held in a constant depressed position by a user of the brake system testing device 5. A slow fade (decline) in the amount of force required to maintain the depressed position of the brake pedal may also be indicative of a leak. The presence of a potential leak may be indicated to a user, and the indication of a leak may cause a test failure, even if the brake pedal stroke distance vs. brake pedal depression force analysis portion of the test produces a passing result.

Obviously, the outcome of a particular brake system test will depend on the criteria used for analysis, which criteria may vary between different vehicle models. In any case, the outcome (pass or failure) of a given brake system test may be indicated to the user of the brake system testing device 5. For example, a graphic and/or alphanumeric message may appear on the display 65, and/or a visual indicator (e.g., green or red light) or audible indicator (e.g., tone or recorded voice message) may be produced at the conclusion of the test. If the test is successful, the brake system testing device 5 may be removed from the associated vehicle and the vehicle may be moved along to a next stage of the manufacturing process. If the test is determined to be a failure, one or more subsequent tests may be conducted and/or the vehicle may be relocated for further troubleshooting and/or repair after the brake system testing device 5 is removed therefrom.

A variety of different data may be collected during a brake system test according to the invention. Such data may include, without limitation, brake pedal stroke distance, brake pedal depression force, brake pedal depression rate, brake fluid (modulator side) pressure, leak presence, test pass/failure, manifold pressure sensor (MAP) sensor reading, engine RPM, engine temperature, brake switch (e.g., brake light and/or cruise control) actuation, and the VIN. Once the brake system testing device 5 has been used to conduct a brake system test, a number of things may be done with the associated data. As a most simplistic option, data relating to a brake system test may simply be purged from the controller at the completion of the test or upon initiation of the subsequent test.

As an alternative to purging such data, the data may be stored. Further, because coupling the controller to the OBD connector of a vehicle allows the controller to read the VIN of the vehicle, data may be stored along with an associated VIN so that brake system test data for a specific vehicle may be easily recalled and reviewed at a later date if desired. Alternatively, the VIN may be captured using a handheld scanner or by another technique for inclusion with the data.

Figure 5:
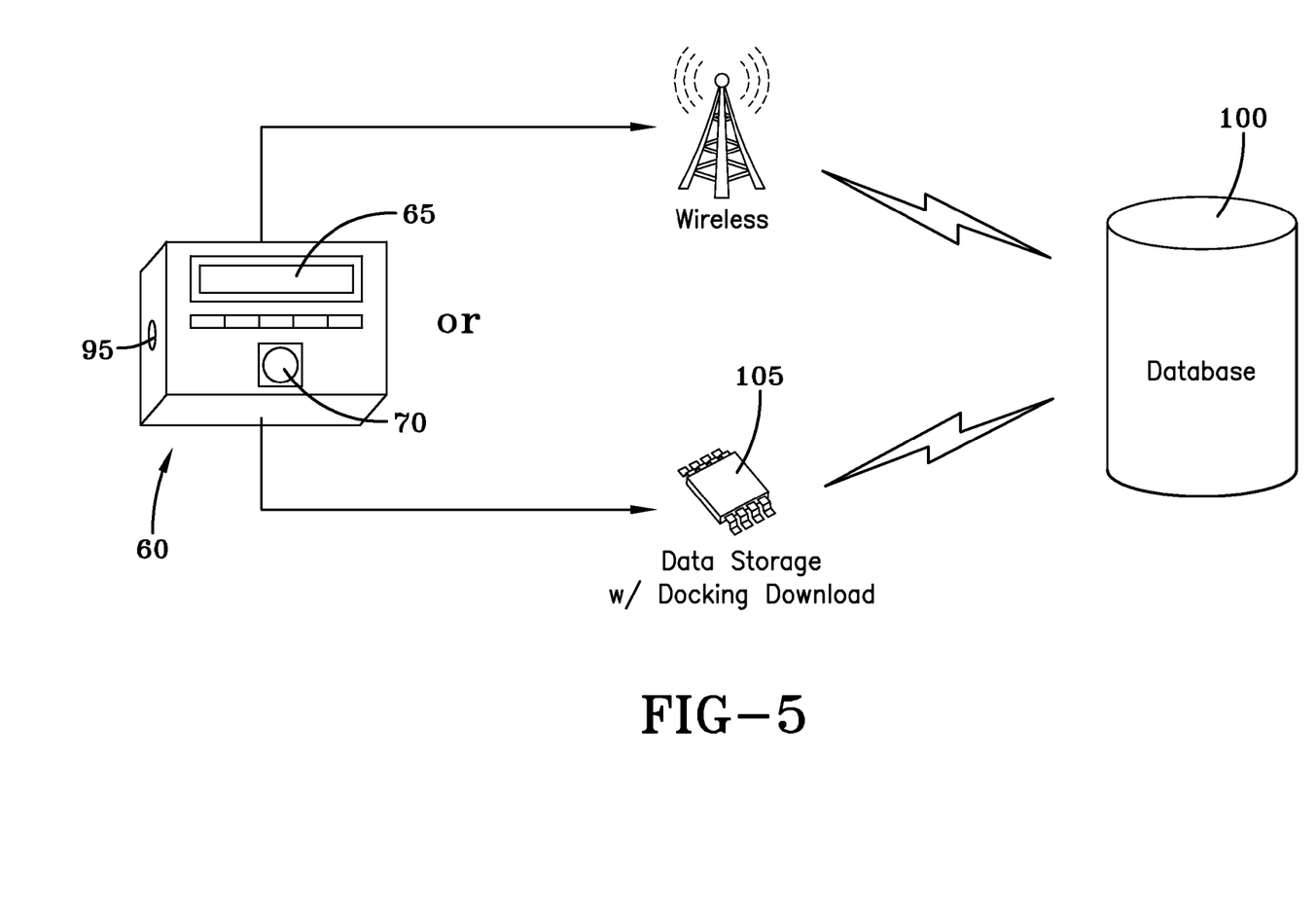
FIG. 5 schematically illustrates how a device of the invention may store and/or transmit to a remote location testing data and other information associate with a brake system testing operation.

Two exemplary but non-limiting brake system test data storage scenarios are schematically illustrated in FIG. 5. In a first scenario, data received or used by the controller 60 during a brake system test including, for example, any or all of the data described above, may be wirelessly transmitted by the controller to a remote database 100. The selected data may be transmitted after each brake system test, at some predetermined time interval, at a particular time of the day, etc. Once transmitted to the database, the data may be immediately purged from the controller 60, may be saved in the controller for some predetermined amount of time, or may be saved in the controller until the related storage space is full, at which time the oldest saved data is automatically deleted as new data is saved. The same storage strategies may be used for all brake system test data or different strategies may be employed for different data (e.g., sensor readings vs. test results). As described above, data transferred according to this first data storage scenario may include the VIN of the tested vehicle.

In a second data storage scenario, data received or used by the controller 60 during a brake system test including, for example, any or all of the data described above, may be saved in memory of the controller 60 until a time where the controller is docked or otherwise connected to a wired network and transmitted to a connected database. The selected data may again be transmitted after each brake system test, at some predetermined time interval, at a particular time of the day, etc. Once transmitted to the database, the data may be immediately purged from the controller 60, may be saved in the controller for some predetermined amount of time, or may be saved in the controller until the related storage space is full, at which time the oldest saved data is automatically deleted as new data is saved. The same storage strategies may be used for all brake system test data or different strategies may be employed for different data (e.g., sensor readings vs. test results). Data transferred according to this second data transfer scenario may also include the VIN of the tested vehicle.

While certain embodiments of the present invention are described in detail above, the scope of the invention is not to be considered limited by such disclosure, and modifications are possible without departing from the spirit of the invention as evidenced by the following claims.

What is claimed is:

1. A passive vehicle brake system testing device, comprising:
    an extendable rod;
    a steering wheel engaging element located at a proximal end of the extendable rod and a brake pedal engaging element located at a distal end of the extendable rod;
    a first sensor adapted to detect an amount of brake pedal travel produced by a user of the device by detecting extension of the extendable rod;
    a second sensor adapted to detect an amount of depressing force applied to the brake pedal by a foot of the user, the second sensor mounted on a foot contact portion of the brake pedal engaging element so as to reside beneath the foot of the user when the foot of the user is placed against the foot contact portion of the brake pedal engaging element;
    a controller in electronic communication with the first and second sensors so as to receive output signals therefrom, the controller including a microprocessor and memory and programmed to analyze data provided by at least the first sensor and the second sensor; and
    a display associated with the controller for indicating at least a pass or failure status of a brake system test to the user of the device.

2. The testing device of claim 1, wherein the extendable rod is a telescopic rod and the steering wheel engaging element is substantially hook-shaped for engagement with a rim of a steering wheel of a vehicle to be tested.

3. The testing device of claim 1, wherein the controller is programmed to decide a pass or failure status of a brake system test by determining whether the detected amount of brake pedal travel is acceptable in view of the detected amount of brake pedal depression force applied.

4. The testing device of claim 3, wherein the controller is further programmed to detect a leak in a vehicle brake system by a methodology selected from the group consisting of:
    (a) monitoring the brake pedal stroke position while the user maintains a substantially constant depression force on the brake pedal, and equating any detected increase in brake pedal travel with a leak; and
    (b) monitoring the brake pedal depression force during the time that the brake pedal is held in a constant depressed position by the user, and equating any detected decline in the amount of force required for the user to maintain the depressed position of the brake pedal with a leak.

5. The testing device of claim 1, wherein the first sensor is located within the extendable rod.

6. The testing device of claim 1, wherein the first sensor is selected from the group consisting of an optical sensor, a Hall effect sensor and a linear variable differential transformer, and the second sensor is selected from the group consisting of a strain-gage based sensor, a piezoelectric sensor and a variable capacitance type sensor.

7. The testing device of claim 1, wherein the first sensor and the second sensor are in wired communication with the controller.

8. The testing device of claim 1, wherein the first sensor and the second sensor are in wireless communication with the controller.

9. The testing device of claim 1, further comprising an on-board diagnostics port for coupling the controller to an on-board diagnostics connector of a vehicle to be tested.

10. The testing device of claim 1, further comprising a biasing element for biasing the extendable rod toward a retracted position.

11. A passive vehicle brake system testing device adapted for removable installation between a steering wheel and brake pedal of a vehicle, comprising:
    an extendable rod;
    a substantially hook-shaped steering wheel engaging element located at a proximal end of the extendable rod for removably coupling the extendable rod to a rim portion of a vehicle steering wheel, and a brake pedal engaging element located at a distal end of the extendable rod, the brake pedal engaging element having a substantially hook-shaped portion for removably coupling the extendable rod to a vehicle brake pedal and a foot contact portion for receiving a foot of a user of the device;
    a stroke measurement sensor associated with the extendable rod and adapted to detect an amount of brake pedal travel by detecting an amount of extendable rod extension resulting from user depression of the brake pedal to which the testing device is coupled;
    a brake pedal depression force sensor mounted on the foot contact portion of the brake pedal engaging element so as to reside between the foot of the user and the brake pedal of a vehicle to be tested when the brake pedal engaging element is coupled thereto and the foot of the user is placed against the foot contact portion of the brake pedal engaging element, the brake pedal depression force sensor adapted to measure the amount of depressing force exerted by the foot of a user on the brake pedal of a vehicle during testing;
    a controller in electronic communication with the stroke measurement sensor and brake pedal depression force sensor so as to receive output signals therefrom, the controller including a microprocessor and memory and programmed to analyze data provided by at least the stroke measurement sensor and brake pedal depression force sensor to determine a pass or failure status of a test based on whether a given amount of brake pedal depression force results in an acceptable of amount of brake pedal travel;
    an on-board diagnostics port on the controller for coupling the controller to an on-board diagnostics connector of the vehicle to be tested; and
    a display associated with the controller for indicating at least a pass or failure status of a brake system test to the user of the device.

12. The testing device of claim 11, wherein the controller is further programmed to detect a leak in a vehicle brake system by a methodology selected from the group consisting of:
    (a) monitoring the brake pedal stroke position while the user maintains a substantially constant depression force on the brake pedal, and equating any detected increase in brake pedal travel with a leak; and
    (b) monitoring the brake pedal depression force during the time that the brake pedal is held in a constant depressed position by the user, and equating any detected decline in the amount of force required for the user to maintain the depressed position of the brake pedal with a leak.

13. The testing device of claim 11, wherein the stroke measurement sensor is located within the extendable rod.

14. The testing device of claim 11, wherein the stroke measurement sensor is selected from the group consisting of an optical sensor, a Hall effect sensor and a linear variable differential transformer, and the brake pedal depression force sensor is selected from the group consisting of a strain-gage based sensor, a piezoelectric sensor and a variable capacitance type sensor.

15. The testing device of claim 11, wherein the stroke measurement sensor and brake pedal depression force sensor are in wired communication with the controller.

16. The testing device of claim 11, wherein the stroke measurement sensor and brake pedal depression force sensor are in wireless communication with the controller.

17. The testing device of claim 11, further comprising a biasing element for biasing the extendable rod toward a retracted position.

18. A method of testing a vehicle brake system by manual depression of the vehicle brake pedal, comprising:
    providing a vehicle brake system testing device adapted for removable installation between a steering wheel and brake pedal of a vehicle to be tested, the device further comprising:
        an extendable rod having a substantially hook-shaped steering wheel engaging element located at a proximal end of the extendable rod and a brake pedal engaging element located at a distal end of the extendable rod,
        a stroke measurement sensor adapted to detect an amount of brake pedal travel by detecting an amount of extension of the extendable rod,
        a brake pedal depression force sensor mounted on the brake pedal engaging element,
        a controller in electronic communication with the stroke measurement sensor and brake pedal depression force sensor so as to receive output signals therefrom, the controller including a programmed microprocessor and memory, and
        a display associated with the controller;
    installing the vehicle brake system testing device between the steering wheel and brake pedal of a vehicle to be tested;
    starting the engine of the vehicle if the engine is not already running;
    causing the controller to initiate a brake system test;
    depressing the brake pedal of the vehicle while stepping on the brake pedal depression force sensor until the display on the controller indicates some predetermined brake pedal depression force;
    maintaining the brake pedal in the depressed position for some predetermined amount of time;
    receiving at the controller, data signals from the stroke measurement sensor and brake pedal depression force sensor;
    releasing the brake pedal;
    using the programmed microprocessor of the controller to analyze the data received from the stroke measurement sensor and brake pedal depression force sensor and to determine whether a given amount of brake pedal depression force results in an acceptable of amount of brake pedal travel; and
    communicating to a user a pass or failure status of the test using the display on the controller of the vehicle brake system testing device.

19. The method of claim 18, further comprising storing data associated with a brake system test in a database.

20. The method of claim 19, wherein the data is wirelessly transmitted from the brake system testing device controller to the database.

21. The method of claim 19, further comprising reading the VIN of a vehicle being tested and associating the brake system test data for that vehicle with the VIN.

22. The method of claim 18, further comprising notifying a user if the brake pedal of a vehicle being tested is depressed at greater than an acceptable rate.

23. The method of claim 18, further comprising providing an on-board diagnostics port on the controller of the vehicle brake system testing device, connecting the controller to an on-board diagnostics connector of the vehicle to be tested, and receiving at the controller signals sent over the on-board diagnostics connection that are indicative of one or more other vehicle conditions.

24. The method of claim 23, wherein the other vehicle conditions are selected from the group consisting of modulator side brake fluid pressure, manifold pressure, engine RPM, engine temperature, brake switch actuation, and the vehicle identification number.

25. The method of claim 23, further comprising reading the VIN of a vehicle being tested via the on-board diagnostics connection and associating the brake system test data for that vehicle with the VIN.

26. The method of claim 18, further comprising detecting a leak in the brake system of a vehicle being tested by sensing a slow increase in brake pedal travel while a user maintains a substantially constant depression force on the brake pedal during the brake pedal depression maintenance phase of the brake system test.

* * * * *